US008482751B2

(12) United States Patent
Alverson et al.

(10) Patent No.: US 8,482,751 B2
(45) Date of Patent: Jul. 9, 2013

(54) RADIO FREQUENCY IDENTIFICATION PRINTING DEVICE

(75) Inventors: David Herman Alverson, Richmond, KY (US); Kevin Dean Schoedinger, Lexington, KY (US); Mark Stephen Underwood, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1279 days.

(21) Appl. No.: 11/939,896

(22) Filed: Nov. 14, 2007

(65) Prior Publication Data

US 2009/0122350 A1    May 14, 2009

(51) Int. Cl.
G06K 15/22   (2006.01)
G06K 1/00    (2006.01)
G06F 15/00   (2006.01)
G06F 3/12    (2006.01)
G06F 17/00   (2006.01)
G06F 17/20   (2006.01)

(52) U.S. Cl.
USPC ......... 358/1.14; 358/1.9; 358/1.15; 358/1.13; 715/229

(58) Field of Classification Search
None
See application file for complete search history.

(56) References Cited

U.S. PATENT DOCUMENTS

| 6,264,106 | B1 | 7/2001 | Bridgelall | |
|---|---|---|---|---|
| 7,207,488 | B2 | 4/2007 | Hammerslaf et al. | |
| 2002/0170973 | A1* | 11/2002 | Teraura | 235/492 |
| 2003/0146836 | A1* | 8/2003 | Wood | 340/540 |
| 2003/0190593 | A1* | 10/2003 | Wisnosky et al. | 434/362 |
| 2005/0105140 | A1* | 5/2005 | Ozaki | 358/402 |
| 2005/0200910 | A1* | 9/2005 | Kanoshima et al. | 358/448 |
| 2005/0226261 | A1* | 10/2005 | Varadarajan et al. | 370/412 |
| 2005/0276520 | A1* | 12/2005 | Leslie et al. | 382/306 |
| 2006/0055721 | A1* | 3/2006 | Burdette et al. | 347/19 |
| 2006/0282761 | A1* | 12/2006 | Pierce et al. | 715/511 |

* cited by examiner

Primary Examiner — Ming Hon

(57) ABSTRACT

This disclosure relates to a system, apparatus and method for incorporating radio frequency identification (RFID) technology into a printing device that may provide an assortment of functional performance capabilities. This may include the ability to scan media information such as text and/or images along with RFID identifier information and process, copy and/or forward such text media and/or identifier information to a remote location.

13 Claims, 4 Drawing Sheets

RADIO FREQUENCY IDENTIFICATION PRINTING DEVICE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates to printers and printing systems. More particularly, this disclosure relates to a system, apparatus and method for incorporating radio frequency identification (RFID) technology into a printing device that may provide an assortment of functional performance capabilities. This may include the ability to scan media information such as text and/or images along with RFID identifier information and process, copy and/or forward such text media and/or identifier information to a remote location.

2. Description of the Related Art

Inkjet and laser printers have become commonplace equipment in most workplace and home computing environments. A recent innovation in printing technology is the incorporation of additional functionality to the base printer to allow scanning, copying, and/or faxing, which devices have been termed "All in One" (AIO) type printers. Such devices may consolidate a number of functions into a single unit. Documents may be scanned and stored to a host computer, printed from the host computer, copied, faxed (from either the scanner or the host) along with a combination of other actions.

Print media is now available which may include embedded radio frequency signatures in the form of Radio Frequency Identification (RFID) transponders or tags. An RFID tag may be an object that may be attached or incorporated into a product for identification purposes using radiowaves. Some tags include an integrated circuit and an antenna. The integrated circuit (IC) may be used for storing and processing information, modulating and demodulating an RF signal, as well as other functions. The antenna may be used to receive and/or transmit the signal. A "chipless" RFID tag may allow for the discrete identification of tags without an integrated circuit, thus minimizing costs. These tags, as used in the printing industry, are sometimes referred to as "Smart Labels" and they may be used for a variety of identification/detection purposes.

SUMMARY OF THE DISCLOSURE

In accordance with one exemplary embodiment, the present disclosure relates to an all-in-one (AIO) printing system including radio frequency identification (RFID) capability. The system includes a printer and a scanner configured to scan media information from a first sheet of media including an RF antenna and an RF radio configured to read RF identifier information associated with the first sheet of media. The printing system may then copy the media and RF identifier information to a subsequent sheet of media and forward the media and RF identifier information to a remote location.

In accordance with another exemplary embodiment, the present disclosure again relates to an all-in-one (AIO) printing system including radio frequency identification (RFID) capability. The system again includes a printer and a scanner configured to scan media information from a first sheet of media including an RF antenna and an RF radio configured to read RF identifier information associated with a first sheet of media. The printing system may then copy the media and RF identifier information to a subsequent sheet of media, forward the media and RF identifier information to a remote location, and compare the RF identifier information with stored RF identifier information. Based upon such comparison, the printing system is capable of either identifying the first sheet of media as a secured document or identifying the date of origin of the first sheet of media and the availability of a differently dated version of such media.

In accordance with yet another embodiment the present disclosure once again relates to an all-in-one (AIO) printing system including radio frequency identification (RFID) capability comprising a printer and a scanner configured to scan media information from a first sheet of media including an RF antenna and an RF radio configured to read and write RF identifier information associated with the first sheet of media. The printing system may then be configured to copy the media and RF identifier information to a subsequent sheet of media, forward the media and RF identifier information to a remote location and compare the RF identifier information with stored RF identifier information. Based upon such comparison, the printing system is then capable of identifying the first sheet of media as a secured document, identifying the availability of a non-secured version of a document, and identifying the date of origin of the first sheet of media and the availability of a differently dated version of said media.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

DETAILED DESCRIPTION

Figure 1:
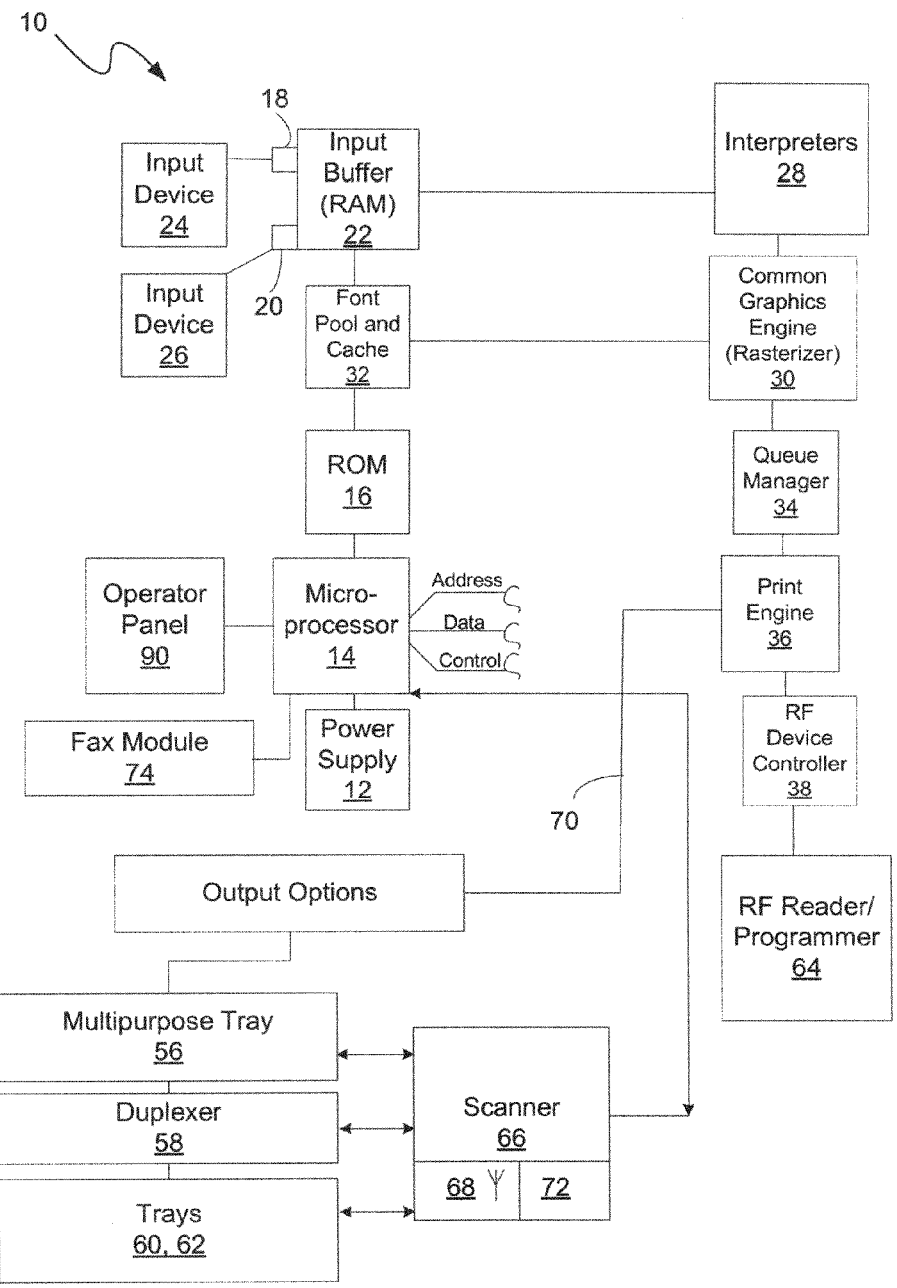
FIG. 1 is a block diagram of an embodiment of an exemplary printing system in accordance with the present disclosure.

It is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

For simplicity the discussion below will use the terms "media", "sheet" and/or "paper" to refer to a discrete unit of media. It should be understood, however, that this term is not limited to paper sheets, and any form of media is intended to be encompassed therein, including without limitation, envelopes, transparencies, postcards, labels, and the like. The present disclosure also applies to an AIO device, which may be understood herein as a printer that is also capable of scanning media information and the RFID tag, along with at least one additional functional performance characteristic such as the ability to copy and/or forward the scanned information to a remote location (e.g. by fax transmission). With respect to the scanning feature, it should be understood that scanning is reference to the ability to scan the media and/or RFID tag, along with the ability to store and/or process such scanned information, as disclosed more fully below. In addition, reference to the printer feature of the AIO device herein is reference to a variety of printer configurations, such as an electrophotographic printer, an inkjet printer, thermal printer, etc. Furthermore, reference to media information may be understood as media text and/or images.

Referring now to the drawings, FIG. 1 shows a hardware block diagram of an exemplary AIO printing device, generally designated by the reference numeral 10, which may now incorporate RFID functionality, which is described more fully below. Printing system 10 may therefore contain certain components, such as a DC power supply 12 that may have multiple outputs of different voltage levels, a microprocessor 14 having address lines, data lines, and control and/or interrupt lines, Read Only Memory (ROM) 16, and Random Access Memory (RAM), which may be divided by software operations into several portions for performing several different functions.

AIO printing device 10 may also contain at least one serial input or parallel input port, network or USB port, or in many cases both types of input ports, as designated by the reference numeral 18 for the serial port and the reference numeral 20 for the parallel port. Each of these ports 18 and 20 may be connected to a corresponding input buffer, generally designated by the reference numeral 22. Serial port 18 may be connected to a serial output port of a personal computer or a workstation that may contain a software program such as a word processor or a graphics package or computer aided drawing package. Similarly, parallel port 20 may be connected to a parallel output port of the same type of personal computer or workstation containing similar types of programs. Such input devices are designated, respectively, by the reference numerals 24 and 26.

AIO printing device 10 may include input buffer 22, which may be configured to receive text or graphical data and to communicate the data to one or more interpreters designated by the reference numeral 28. A common interpreter is PostScript™, which is an industry standard used by some laser printers. After being interpreted, the input data may be sent to a common graphics engine to be rasterized, which may occur in a portion of RAM designated by the reference numeral 30. To speed up the process of rasterization, a font pool and possibly also a font cache may be stored, respectively, in ROM or RAM within most laser printers, and these font memories are designated by the reference numeral 32. Such font pools and caches may supply bitmap patterns for common alphanumeric characters so that the common graphics engine 30 can easily translate each such character into a bitmap using a minimal elapsed time.

Once the data has been rasterized, it may be directed into a Queue Manager or page buffer, which may be a portion of RAM designated by the reference numeral 34. In a typical printer, an entire page of rasterized data may be stored in Queue Manager 34 during the time interval that it takes to physically print the hard copy for that page. The data within the Queue Manager 34 may be communicated in real time to a print engine designated by the reference numeral 36. Print engine 36 may include a laser light source within its printhead (not shown), and its output may be the physical marking on a piece of paper, which may be the final print output from printing system 10. However, as noted above, the AIO printing devices herein may include any device that may transfer media information such as text and/or images to a given sheet of media.

In some embodiments, the address, data, and control lines may be grouped in buses, which are electrically conductive pathways that are physically communicated in parallel (sometimes also multiplexed) around the various electronic components within printing system 10. For example, the address and data buses may be sent to all ROM and RAM integrated circuits and the control lines or interrupt lines may be directed to all input or output integrated circuits that act as buffers.

Print engine 36 may contain the core print logic which may be embodied in an Application Specific Integrated Circuit (ASIC) (not shown), for example, and which may act as the printing device's primary controller and data manipulating device for the various hardware components within the print engine 36. The bitmap print data arriving from Queue Manager 34 may be received by the core print logic, and at the proper moments may be sent in a serialized format to the laser printhead.

Print engine 36 may be in communication with a number of paper-handling devices via a communications bus 70. Some of the paper-handling devices depicted on FIG. 1 may include output options such as a multipurpose tray 56, a duplexer 58, and trays 60 and 62. The output options may vary depending on the particular finish functionality provided by the printing system 10. Examples of output options may include, but are not limited to, a single output bin, a 5-bin multi-bin stacker and/or a single bin stapler finishing option. Some or all of these paper handling devices may be within range of an RFID radio and/or other RFID components as is discussed in further detail below.

The AIO printer 10 may include an RFID apparatus or module that is capable of reading and/or writing information from an RFID tag. For example, an RF device controller 38 may be included that may be configured to communicate and/or control a variety of RF devices associated with AIO printer 10. One such device may be an RF reader/programmer 64, which may be configured to program and communicate with other RFID components and identifiers. RF reader/programmer 64 may include a transmitter, receiver, control unit and a coupling element such as an antenna. Programmer 64 may be configured to energize, demodulate and decode various radio frequency signals. Programmer 64 may be configured to convert radio waves returned from a given RFID tag for data transmission associated with printing system 10.

RF reader/programmer 64 may be in radio frequency communication with any or all of the media present in any or all of the paper handling devices discussed above. For example, each tray 60, 62 may be configured to hold media, which may contain one or more identifiers. An identifier as described herein may therefore be understood to include, e.g., an RFID transponder, an RFID tag (e.g., active, passive and/or semi-passive), a "smart card", a "smart label", a microchip/antenna package, a "chipless" RFID tag, or any other programmable identification device. As discussed above a "chipless" RFID tag (e.g., RF fibers) may not make use of any integrated circuit technology to store information. The tag may also use fibers or materials that reflect a portion of a reader's signal, such a unique return signal may then be used as for identification purposes.

Within each tray 60, 62, and as between trays, individual sheets of media may have a different number of tags. With respect to media having the same number of tags, the tags may be arranged at different locations. For example, one media type may have a single tag located in the center of the page near the leading edge. A different media type may have two tags, one in the upper left corner and the other at mid-page on the right side. It may also be appreciated that as between trays, the nature of the media in which the RFID tags may be embedded may differ. For example, the media may be paper, label, cardstock, transparencies, etc. AIO device 10 may be used to select a media input source (e.g., trays 60 and/or 62) for printing RFID media. The selection of a media input source tray may therefore be based upon the scanned RFID tag information that is obtained from a given sheet of media that is to be replicated. Although only two trays are shown, it is contemplated that any number of input sources may be used in accordance with the present disclosure.

It may therefore be appreciated that within each tray, and as between trays, the media may have different types of RFID tags, each intended to have, or having, its own programmed data which tag may then communicate via the use of radio waves. Furthermore, as noted above, the RFID tags may differ with respect to whether or not the tags are a passive tag, which may be understood as those tags that are ultimately powered by an RFID reader/programmer, or an active tag, in which case the RFID tag may have its own power source. Some passive RFID tags may make use of a coiled antenna that may create a magnetic field using the energy provided by the reader's carrier signal. The RFID tags may also include semi-passive tags, which may have a power source, which may be used for on tag sensing. The RFID tags may also be a read only tag that contains unique programming that cannot be changed, or a write once read many (WORM) tag that may enable users to encode tags at the first instance of use wherein the code may then become locked. The RFID tags may also be a read/write tag that allows for updated or new information to be written to the tag. As discussed more fully below, the AIO printing system 10 may include a scanner 66 having RFID components associated therewith.

Scanner 66 may provide imaging processing capabilities for printing system 10. Scanner 66 may include a number of different components, for example, scanner 66 may include a scan head, which may include a charge-coupled device (CCD) array configured for text and/or image capture. The text and/or image of the scanned document may reach the CCD array via a system of mirrors, filters and lenses configured to provide image transfer. Scanner 66 may also include additional components such as a glass plate and a lamp configured to illuminate the document. Some lamps may include, but are not limited to, cold cathode fluorescent lamps (CCFL), xenon lamps, and standard fluorescent lamps.

In some embodiments, scanner 66 of AIO device 10 may be a flatbed scanner, capable of scanning documents one at a time, or a feeder scanner (capable of continuous scanning) or combination scanner. As a feed scanner, and as illustrated, the scanner may continuously receive media from multipurpose tray 56 or trays 60 or 62. Scanner 66 herein may now include RFID components such as an RFID antenna 68 and an RFID radio 72. RFID antenna 68 may be in communication with scanner 66 so that a sheet of RFID media placed on the scanner may be within the field of RFID antenna 68. RFID antenna 68 may be in communication with RFID radio 72, either or both of which may be in communication with other various components of AIO printing device 10, such as RF device controller 38. For example RFID antenna 68 may be in radio frequency communication with media located at any given point within AIO printing device 10. Therefore, the read/write range of RF antenna 68 may be capable of effectively communicating with any or all of the RFID tags present on media at any location within AIO printing device 10.

In some embodiments, more than one antenna may be utilized. For example, in that situation where antenna 68 may be limited to communication with RFID tags present on media on scanner 66, another antenna may be positioned anywhere within AIO device 10 to target that area wherein media may travel during a given printing operation. For example, additional antennas may be positioned at or proximate trays 60, 62, duplexer 58 (which allows for multi-sided printing) or multipurpose tray 56. The AIO device herein therefore contemplates the use of a plurality of antennas, such as 2-10 antennas, including any range or selected number of antennas therein. In addition, it is contemplated herein that one may utilize a single RFID radio 72 along with antenna switching electronics, so that the single radio may communicate and drive all antennas in a selected read/write operation, wherein the communication may then be multiplexed to provide discrete communication pathways with selected RFID tags and their associated media.

It may now be appreciated that RFID scanner antenna 68 may include a stationary antenna having a broad field that may be capable of covering the entire scan bed. However, flatbed scanner antenna 68 may also be configured to have a more narrowly focused antenna configured to move in conjunction with a moving component of the scanner, such as the scanner head. In such a situation, scanner 66 may be used to calibrate (e.g. identify the location of an attached RFID tag) which may be particularly useful for multiple-tag media. For example, an operator may place a sample of media containing one or more RFID tags on the flat scanner bed (not shown) of scanner 66 and initiate a calibration protocol. As the media is scanned, the control firmware of system 10 may note the position of the scanner head with respect to a position (e.g., the leading edge, trailing edge, etc.) of the media as antenna 68 reads one or more tags on the media. Such tag positioning information may then be forwarded to printing device 10 for use with this particular media type and the printing and programming of the RFID tag on the media may be accomplished according to RFID tag location with respect to such particular media type.

Device 10 may further include a display, such as operator panel 90, which may provide information pertaining to device 10. For example, a graphical representation of a given sheet of media indicating whether or not an identifier has been properly programmed may be provided. Operator panel 90 may also provide data regarding the presence or absence of RFID components within device 10 as well as whether the components of device 10 are functioning properly. For example, in some embodiments, operator panel 90 may provide a technician with troubleshooting instructions or other information if the data from the identifier does not correspond to an expected value.

Figure 3:
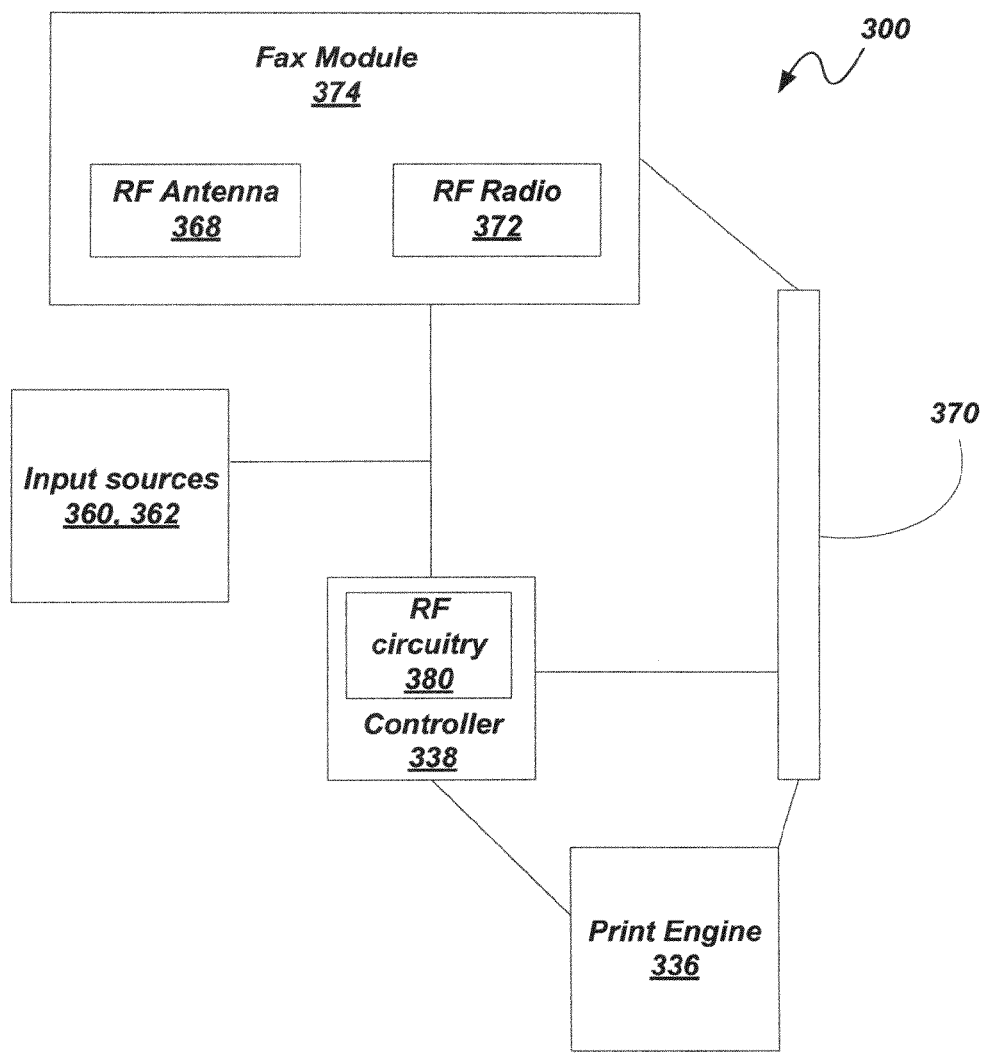
FIG. 3 is a block diagram of yet another exemplary embodiment of a printing system showing in greater detail a fax machine of a printing system having radio frequency components.

In addition, the size and/or position of RFID tags present on the media of a given input source may be made visible using operator panel 90. Operator panel 90 may then provide a user with the option of selecting or canceling the particular print job. Operator panel 90 may be further configured to provide status information regarding RF antenna 68, RF radio 72, RF reader/programmer 64 and/or RF device controller 38. As discussed above, these RFID components described herein may be located anywhere within device 10. Through operator panel 90 a user may be able to control the operation of various RFID components such as those discussed above with reference to scanner 66 and those described below in FIG. 3 regarding fax module/machine 74. As expected, various displays may be used, such as, for example, an all-points addressable display panel.

It should be noted that printing device 10 may utilize any of a variety of different communication protocols to implement the communication techniques described herein. For example, in some embodiments, some possible communication protocols may include, but are not limited to, Bluetooth, Wireless Fidelity (Wi-Fi), and/or Electronic Product Code (EPC) protocols. Of course, any communication protocol may be used without departing from the scope of the present disclosure.

Figure 2:
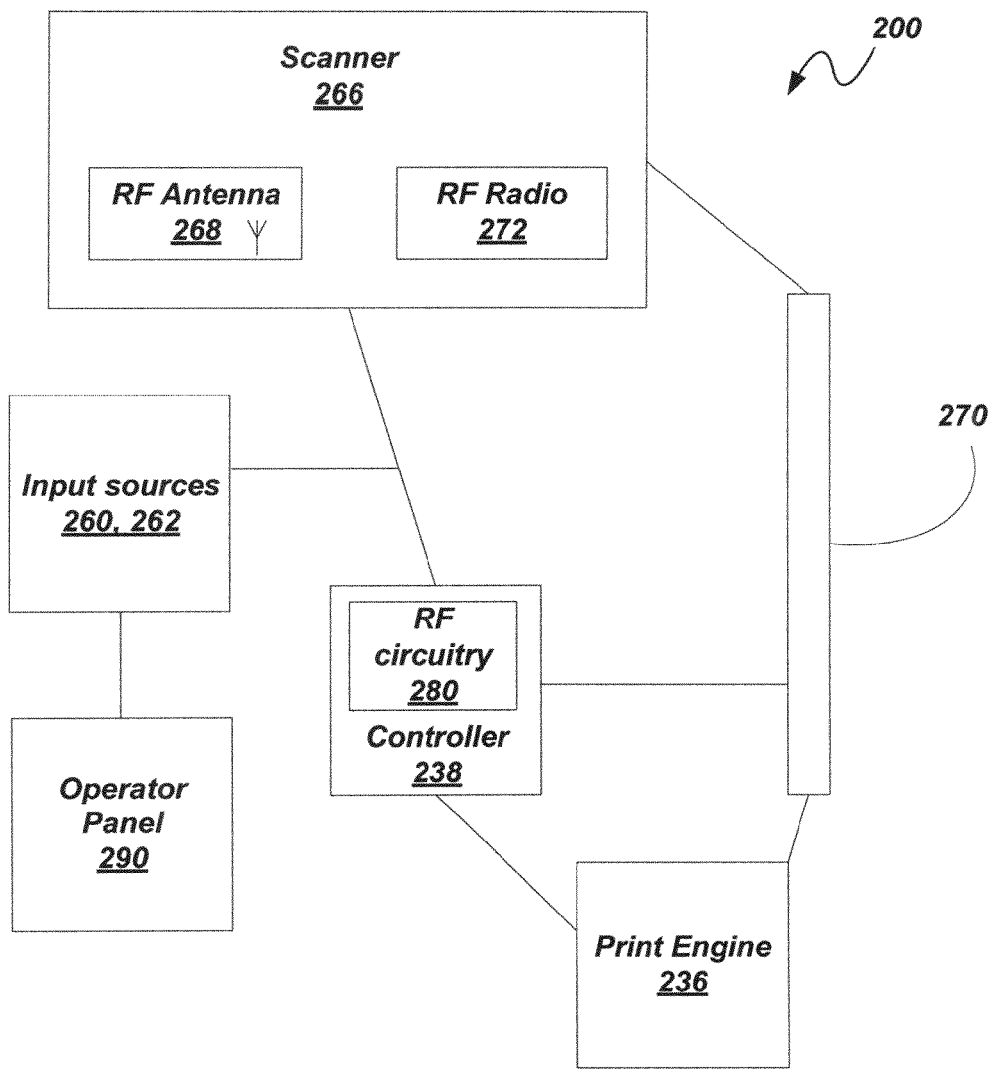
FIG. 2 is a block diagram of another exemplary embodiment of a printing system showing in greater detail a scanner of a printing system having radio frequency components.

FIG. 2 illustrates in more general view a printing system 200 again including a scanner 266 having RFID capability in order to elaborate on some additional characteristics of the present disclosure. Accordingly, system 200 may once again generally include a print engine 236 coupled to input sources 260, 262 and scanner 266 via communication bus 270. Scanner 266 may include RF antenna 268 and RF radio 272 as well as other components and may be used to interrogate an identifier, such as an RFID tag. Scanner 266 may also include or be connected with RF circuitry 280 and controller 238. RF antenna 268 may be configured to emit radio waves of various frequencies. In some embodiments, RF antenna 268 may be a conductive element that may be used by scanner 266 to read and/or program an identifier (e.g., a radio frequency device tag) as well as to confirm whether an identifier is working or defective. RF antenna 268 may be in communication with at least one identifier, which may respond by transmitting data back to antenna 268. This data may be transmitted in accordance with a variety of different communication protocols having different frequency ranges. A number of factors may affect the distance at which a tag may be read (i.e., the read range). The frequency used for identification, the antenna gain, the orientation and polarization of the reader antenna and the transponder antenna, as well as the placement of the identifier on an object to be identified may all have an impact on the read range of system 200.

In some embodiments, radio frequency control circuitry 280 may attempt to read and/or program a tag embedded in the media and then note the success or failure of this attempt. The radio frequency control circuitry 280 may then monitor or "listen" on its communications port to track the page's location as it moves through the printer. It is contemplated that controller 238 may be packaged into an aftermarket option that may be installed in a printer, such as printing device 10, without modification of the printer's other systems such as print engine 236 including the core print logic.

As alluded to above, the AIO printing device herein may also include test routines that may be capable of detecting certain failures or errors. Some of these errors may include, but are not limited to, an inability to communicate with RF Antenna 268 and/or RF radio 272, or an indication of a problem with antenna 268 forwarded from radio 272. The AIO printing device herein may include firmware having check routines that may validate the data passed down from a print job. These check routines may also be capable of detecting instances of data corruption or other internal errors. If an error is detected an error message may be presented to operator panel 290 which may present descriptive debug information for a repair technician.

In operation, a user may place a sheet of print media having an RFID tag located thereon into scanner 266. The user may then initiate a scanning operation via operator panel 290. The firmware associated with printing system 10 may then command RF antenna 268 and/or RFID radio 272 to read the RFID media. If a tag is present and readable, RFID radio 272 may return the data from the RFID tag (along with a "success" notification) to the system firmware. This operation may occur prior to, concurrent with, and/or after the image scanning operation. At this point, numerous additional operations may be performed, either alone or in combination with each other, which operations are described below.

For example, the data read from the RFID tag may be sent to the host computer for processing. That is, the host computer may identify that a scan has occurred and may store the RFID tag data along with the scanned image data. The host computer may be further configured to specifically compare the tag data against stored tag data in, e.g., tag data that may be provided in a look-up table (LUT). Such comparison may then provide the opportunity to provide any one or more of the following instructions which may appear on the AIO operator panel: 1. an indication that the scanned document is considered a secured document for which no copies are authorized, and/or for which the number of copies has been exceeded, and/or for which only a certain amount of copies may be produced, and/or for which approval must be provided for copying to proceed; 2. an indication that the document is considered a secured document with the indicator that a non-secured version of the document is available for reproduction by the AIO device; 3. an indication that the document is not the most current version and/or that a revised and/or updated version of the document is available for reproduction by the AIO device.

In addition, during a scan or copy operation, the tag data may be forwarded to components within AIO printing device 10 (e.g., microprocessor 14 in FIG. 1). Here, a programmer such as RF Reader/Programmer 64 of printing system 10 and/or RF radio 72 of scanner 66 may use this same data to program the RFID tag in media to be copied, which may be located in one of the paper handling devices of FIG. 1. This may allow a document containing text and/or images, including an RFID tag, to be fully replicated.

It should therefore be recognized that the data in the RFID identifier may now be modified or altered during a copying process. For example, "a number of copies" count in the tag may be incremented, or a document serial number may be incremented in order to preserve uniqueness and/or control the number of copies created. Moreover, a host computer system and/or operator panel 90, 290 associated with AIO printing device 10 may itself be electronically notified of such copying for document tracking purposes.

In some embodiments, printing device 10 may be configured to write to an RFID tag located upon an already scanned sheet of media in order to indicate that the document has been scanned. Additional information, such as the number of times the document has been scanned, the destination (address) of the scan (e.g., host computer, printer, fax telephone number, email address, etc.), and the person or entity responsible for the scan may be programmed and/or recorded in the RFID tag for other uses, such as document tracking.

Moreover, the scanned data (RFID information and/or media information) may be displayed on a graphical user interface (GUI) screen associated with the host computer and/or on operator panel 90 of AIO printing device 10. Accordingly, a user may then enter data on operator panel 90 which may be written to the tag or the user may overwrite the scanned RFID and media information. For example, the user may modify the scanned data before implementing a copy operation which may then allow the user to customize or modify the scanned data as it may appear on a given tag associated with a given sheet of print media. Accordingly, modification of the scanned RFID and media information may be understood as inputting a change to such information prior to a user's decision to, e.g. replicate or forward the information to a selected destination.

The AIO device 10 herein may also allow an operator to enter a tag value or set of tag values (or a search expression) on operator panel 90, indicate an operation to be performed (e.g., copy, scan, fax, scan-to-host, notify on panel, etc.) and place a stack of RFID media into any one of the trays available for input. For example, the multipurpose tray 56, duplexer 58, and/or trays 60 and 62, which may provide for auto feeding of selected media. Scanner 66 may then scan each sheet while searching for the indicated tag values. If a tag is found that meets the search criteria, a user-indicated operation may be performed on that page. This may allow for the relatively fast retrieval and operation on a particular page in a tagged document (e.g. a document having a plurality of tags) or set of documents (e.g. a plurality of documents each having an RFID tag). Of course, in the absence of an automated document feeding system the operator may place each successive page on the scanner bed to accomplish a similar result.

Referring again to FIG. 1, the AIO device 10 may include a fax module 74 which may therefore provide the ability to forward scanned information to a remote location. Reference herein to a remote location may be understood as another device that includes its own microprocessor for receipt of the scanned information. As described above, the scanned information may include media information (text and/or images) from a given sheet of media as well as information scanned from an identifier such as an RFID tag. Attention is therefore directed to FIG. 3 which further elaborates on this additional characteristic of the present disclosure. As can be seen, the AIO device 300 may incorporate a facsimile "fax" module 374 which may house the RFID components noted above. However, while a fax module may be one example of providing the ability to forward information to a remote location, it can be appreciated that other techniques may be utilized. For example, the AIO device 10 may forward information to a remote location by internet communication which may therefore include forwarding by electronic mail or other related protocol.

Accordingly, utilizing a fax module as just one example of forwarding capability, the fax module 374 may itself include the ability to scan text and/or image from a sheet of media. Fax module 374 may therefore be configured to transfer and receive copies and may therefore house the hardware for RFID operation. For example, fax module 374 may include RFID antenna 368 and RFID radio 372. In some embodiments, fax module 374 may further include RFID circuitry 380 and controller 338. However, RF circuitry 380 and controller 338 may be located separate from fax module 374.

During a fax operation, the RFID data may be handled along with the image data. For example, for an outgoing fax, the RFID data may be included with the image data, so that a corresponding device (e.g., another RFID enabled AIO device) receiving the fax may re-create the page and/or the tag. For an incoming fax, incoming RFID data may now be used to recreate a tag on the incoming fax, or if no RFID data is present in the fax itself, an RFID tag on the printed document may be programmed with information pertaining to, e.g. the time, date, and/or source (location) of any incoming message.

Figure 4:
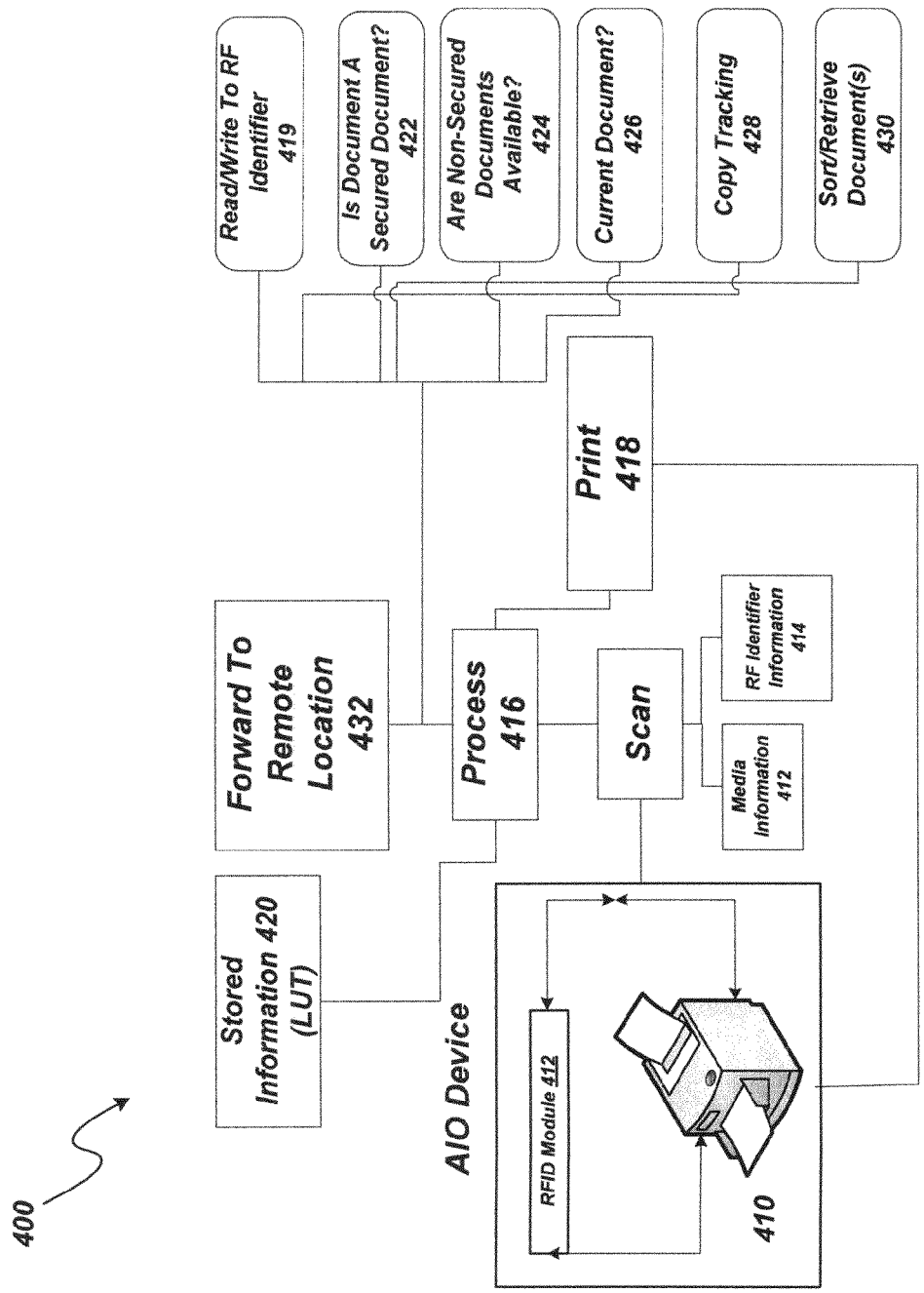
FIG. 4 is a flow diagram showing an exemplary method in accordance with the present disclosure.

FIG. 4 provides a general view 400 depicting an AIO device 410 that includes an RFID module 412, which module may be contained within the device 410. As noted above, the AIO device may scan one or more sheets of media and simultaneously read one or more RF identifiers associated therewith and identify/store media information 413 and/or RF identifier information 414. The scanned information may be processed at 416 (by e.g., a processor within and/or external to the AIO device) at which point it may cause printing at 418 of a subsequent sheet of media, which sheet of media may also include replication (writing) of the scanned RF identifier(s) as shown generally at 419. In addition, the processing may include an evaluation of the RF identifier from stored information 420, which as noted, may include a look-up table. The processor may then identify at 422 whether the document associated with the RF identifier is a secured document for which no copying is authorized. The processor may also identify from the stored information that a particular sheet of media is present and report to a remote location at 432 that the media is being scanned. The processor may await instructions from the remote location as to whether or not replication of the media and/or RF identifier is approved or denied.

In addition, the processor may identify at 424 whether or not a non-secured alternative document is available. Moreover, the processor may consider at 426 the date of origin of the document (e.g. when the document may have been written or approved for release and distribution) due to information scanned and made available from the RF identifier. This may then be followed by an evaluation as to whether or not a differently dated (e.g. up-dated) version and/or versions of the document are available. For example, in a situation where a document discloses a testing protocol, the processor may determine whether or not such testing protocol is the most recent version by reference to the stored information 420. In addition, the processor may carry out copy tracking at 428, where it may write to the identifier on the original scanned document reporting the number of copies that may have been produced by AIO device 10. In addition, at 430, the processor may sort through the scanned documents in order to retrieve a particular document having a particular RF identifier. Finally, as illustrated, the scanned media information and/or identifier information may be forwarded at 432 to a remote location.

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

It should be understood that modifications can be made to the disclosure in light of the above detailed description. The terms used in the following claims should not be construed to limit the disclosure to the specific embodiments disclosed in the specification and the claims. Rather, the scope of the disclosure is to be determined entirely by the following claims, which are to be construed in accordance with established doctrines of claim interpretation.

What is claimed is:

1. An all-in-one (AIO) printing system including radio frequency identification (RFID) capability comprising:
    a printer;
    a scanner configured to scan media information from a first sheet of media, said scanner including an RF antenna and an RF radio configured to read RF identifier information associated with said first sheet of media;
    said printing system configured to: compare said RF identifier information with stored RF identifier information and based upon said comparison, said printing system performs the following:
    (i) identifying said first sheet of media as a secured document, denying replication thereof, determining an existence of a non-secured version of said first sheet of media, identifying an availability of the non-secured version of said first sheet of media for reproduction by the AIO printing system, and reproducing the non-secured version thereby;
    (ii) identifying a date of origin of said first sheet of media and an availability of a differently dated version of said first sheet of media.

2. The AIO printing system of claim 1 wherein said printing system is configured to receive instructions from a remote location and copy at least one of said media information and said RF identifier information to a subsequent sheet of media.

3. The AIO printing system of claim 1 wherein said printing system is configured to write RF identifier information to said first sheet of media.

4. The AIO printing system of claim 3 wherein said written identifier information comprises information regarding the number of times said first sheet of media was scanned.

5. The AIO printing system of claim 1 including a graphical user interface configured to display said scanned media and RF identifier information wherein said scanned media and RF identifier information may be modified by user input.

6. The AIO printing system of claim 1, wherein said printing system is configured to locate a media sheet having at least one RFID tag with user-selected RF identifier information from a plurality of media sheets having RFID tags.

7. The AIO printing system of claim 1, wherein said printing system is further configured to receive a particular tag value from the user and to search sheets of media containing RFID tags for at least one RFID tag having stored therein the particular tag value received from the user.

8. The AIO printing system of claim 1, wherein said scanner includes a moveable scan component and said RF antenna is coupled thereto so as to be moveable with said moveable scan component during a scan operation.

9. An all-in-one (AIO) printing system including radio frequency identification (RFID) capability comprising
    a printer;
    a scanner configured to scan media information from a first sheet of media, said scanner including an RF antenna and an RF radio configured to read and write RF identifier information associated with said first sheet of media;
    said printing system configured to compare said RF identifier information with stored RF identifier information and based upon said comparison, said printing system is configured to:
    (i) identify said first sheet of media as a secured document and deny reproduction thereof;
    (ii) determine whether a non-secured version of said first sheet of media exists;
    (iii) upon an affirmative determination, identify to a user an availability of the non-secured version of said first sheet of media for reproduction by the AIO printing system; and
    (iv) identify a date of origin of said first sheet of media and an availability of a differently dated version of said first sheet of media for reproduction by the printing system.

10. The AIO printing system of claim 9 wherein said printing system is configured to write identifier information regarding the number of times said first sheet of media was scanned.

11. The AIO printing system of claim 9, wherein said printing system is further configured to receive a particular tag value from a user and to search sheets of media containing RFID tags for an RFID tag having stored therein the particular tag value.

12. The AIO printing system of claim 11, wherein if a tag in a searched media sheet is determined to have stored therein said particular tag value received from the user, a user-indicated operation is performed by said printing system on said media sheet containing said tag having stored therein said particular tag value.

13. The AIO printing system of claim 9, wherein said scanner includes a moveable scan component and said RF antenna is coupled thereto so as to be moveable with said moveable scan component during a scan operation.

* * * * *